US011527362B2

(12) United States Patent
Kato

(10) Patent No.: US 11,527,362 B2
(45) Date of Patent: Dec. 13, 2022

(54) MULTI-LAYER CERAMIC CAPACITOR AND METHOD OF PRODUCING THE SAME

(71) Applicant: TAIYO YUDEN CO., LTD., Tokyo (JP)

(72) Inventor: Yoichi Kato, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 282 days.

(21) Appl. No.: 16/777,578

(22) Filed: Jan. 30, 2020

(65) Prior Publication Data

US 2020/0258689 A1 Aug. 13, 2020

(30) Foreign Application Priority Data

Feb. 13, 2019 (JP) .............................. JP2019-023313

(51) Int. Cl.
*C04B 35/468* (2006.01)
*C04B 35/486* (2006.01)
(Continued)

(52) U.S. Cl.
CPC ........... *H01G 4/30* (2013.01); *C04B 35/4682* (2013.01); *C04B 35/486* (2013.01); *H01G 4/005* (2013.01);
(Continued)

(58) Field of Classification Search
CPC ............ B32B 18/00; C04B 2235/3236; C04B 2235/3418; C04B 2235/5445; C04B 2235/5454; C04B 2235/781; C04B 2235/79; C04B 2235/85; C04B 2237/346; C04B 2237/584; C04B 2237/704; C04B 2237/80; C04B 35/4682; C04B 35/486;
(Continued)

(56) References Cited

U.S. PATENT DOCUMENTS

2008/0266751 A1\* 10/2008 Yamazaki ......... C04B 35/62815
361/321.4
2012/0229951 A1 9/2012 Kim
(Continued)

FOREIGN PATENT DOCUMENTS

JP 2015029123 A 2/2015

*Primary Examiner* — Timothy J Thompson
*Assistant Examiner* — Guillermo J Egoavil
(74) *Attorney, Agent, or Firm* — Law Office of Katsuhiro Arai

(57) ABSTRACT

A multi-layer ceramic capacitor includes: a first region including a polycrystal including, as a main component, crystal grains free from intragranular pores; a second region that includes a polycrystal including, as a main component, crystal grains including intragranular pores and includes a higher content of silicon than a content of silicon in the first region; a capacitance forming unit including ceramic layers laminated along a first direction, and internal electrodes disposed between the ceramic layers; and a protective portion including a cover that covers the capacitance forming unit and constitutes a main surface facing in the first direction, a side margin constituting a side surface facing in a second direction orthogonal to the first direction, and a ridge constituting a connection portion, the connection portion connecting the main surface and the side surface to each other. The ceramic layers include the first region. The ridge includes the second region.

7 Claims, 15 Drawing Sheets

(51) Int. Cl.
*H01G 4/005* (2006.01)
*H01G 4/12* (2006.01)
*H01G 4/30* (2006.01)

(52) U.S. Cl.
CPC ......... *H01G 4/1209* (2013.01); *H01G 4/1281* (2013.01); *C04B 2235/781* (2013.01); *C04B 2235/85* (2013.01)

(58) Field of Classification Search
CPC .... C04B 35/468; H01G 4/005; H01G 4/0085; H01G 4/012; H01G 4/1209; H01G 4/1227; H01G 4/1245; H01G 4/1281; H01G 4/224; H01G 4/30; H01G 4/12
USPC ........................ 361/301.4, 500, 305; 174/260
See application file for complete search history.

(56) References Cited

U.S. PATENT DOCUMENTS

| | | | |
|---|---|---|---|
| 2017/0018363 A1* | 1/2017 | Tanaka | H01G 4/30 |
| 2018/0182555 A1* | 6/2018 | Kowase | H01G 4/30 |
| 2019/0189355 A1* | 6/2019 | Tanaka | H01G 4/005 |
| 2020/0168397 A1* | 5/2020 | Ryoo | H01G 4/224 |

* cited by examiner

MULTI-LAYER CERAMIC CAPACITOR AND METHOD OF PRODUCING THE SAME

BACKGROUND ART

The present disclosure relates to a multi-layer ceramic capacitor and a method of producing the multi-layer ceramic capacitor.

A multi-layer ceramic capacitor includes a protective portion for protecting the periphery of internal electrodes. In order to achieve miniaturization and an increase in capacitance of the multi-layer ceramic capacitor, it is favorable to thin the protective portion, which does not contribute to formation of a capacitance, as much as possible. Japanese Patent Application Laid-open No. 2015-029123 discloses a technique capable of thinning the protective portion.

In the technique disclosed in Japanese Patent Application Laid-open No. 2015-029123, a multi-layer unit including internal electrodes, which are exposed on the side surfaces of the multi-layer unit, is produced, and protective portions (side portions) are provided to the side surfaces of the multi-layer unit. In such a multi-layer ceramic capacitor, even if the side portions are thinned to achieve the miniaturization and the increase in capacitance, the side portions can suitably protect the side surfaces of the multi-layer unit, from which the internal electrodes are exposed.

SUMMARY OF THE INVENTION

However, in the multi-layer ceramic capacitor, as the protective portion becomes thinner, an insulation failure is more prone to occur due to cracks that are generated in the protective portion and then reach the internal electrodes. For that reason, in the multi-layer ceramic capacitor, there is a demand for a technique capable of achieving miniaturization and an increase in capacitance while ensuring high durability.

In view of the circumstances as described above, it is desirable to provide a multi-layer ceramic capacitor and a method of producing the multi-layer ceramic capacitor, which are capable of achieving miniaturization and an increase in capacitance while ensuring high durability.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a multi-layer ceramic capacitor including a first region, a second region, a capacitance forming unit, and a protective portion.

The first region includes a polycrystal including, as a main component, crystal grains free from intragranular pores.

The second region includes a polycrystal including, as a main component, crystal grains including intragranular pores and includes a higher content of silicon than a content of silicon in the first region.

The capacitance forming unit includes ceramic layers laminated along a first direction, and internal electrodes disposed between the ceramic layers.

The protective portion includes a cover that covers the capacitance forming unit and constitutes a main surface facing in the first direction, a side margin constituting a side surface facing in a second direction orthogonal to the first direction, and a ridge constituting a connection portion, the connection portion connecting the main surface and the side surface to each other.

The ceramic layers include the first region.

The ridge includes the second region.

The content of silicon of the second region may be 0.5 mol % or more.

The multi-layer ceramic capacitor includes the first region and the second region that are different from each other in configuration. Unlike the second region, the first region is free from intragranular pores or an excessive amount of silicon, which are causes of a reduction in capacitance. Thus, if at least the plurality of ceramic layers are constituted as the first region, the capacitance of the multi-layer ceramic capacitor can be ensured.

The second region can suppress the progress of cracks because of the configuration including the intragranular pores and the excessive amount of silicon. Thus, if the ridge that is particularly susceptible to an external impact in the protective portion is configured as the second region, an insulation failure due to cracks, which are generated in the protective portion and then reach the capacitance forming unit, can be suppressed.

More specifically, the second region including the excessive amount of silicon has improved mechanical strength at grain boundaries between the crystal grains because of the segregation of silicon at the grain boundaries. Thus, in the second region, the progress of cracks, which are liable to be generated in general polycrystals, along a crystal grain boundary is less prone to occur.

This makes it possible to cause the crack to progress through a path that traces the intragranular pores in the second region. In the course of the progress, each time a crack reaches an intragranular pore, the stress at the tip of the crack, which is to be a propulsion force for the crack, is weakened. Consequently, the intragranular pores hinder the progress of cracks in the second region, and the progress of cracks is thus suppressed.

As described above, in the configuration described above, an insulation failure can be suppressed without involving the reduction in capacitance. Further, in the configuration described above, the progress of cracks generated in the protective portion is suppressed, and the protective portion can thus be thinned more. This allows further miniaturization and an increase in capacitance of the multi-layer ceramic capacitor.

The side margin may include the second region.

A dimension of the side margin in the second direction may be 30 µm or less.

In the protective portion with those configurations, the progress of cracks in not only the ridge but also the side margin can be suppressed. Thus, in the multi-layer ceramic capacitor, higher durability can be ensured. Even if the thickness of the side margin is reduced to 30 µm or less, an insulation failure can be prevented from occurring.

The protective portion may include the second region over the entire protective portion.

In the protective portion with this configuration, the progress of cracks can be suppressed over the entire pro tective portion. Thus, the multi-layer ceramic capacitor can ensure still higher durability.

The cover may include the second region.

In the protective portion with this configuration, the progress of cracks in not only the ridge but also the cover can also be suppressed. Thus, the multi-layer ceramic capacitor can ensure higher durability.

Each of the first region and the second region may include a polycrystal having a Perovskite structure including barium and titanium.

According to another embodiment of the present disclosure, there is provided a method of producing a multi-layer ceramic capacitor, the method including: preparing a first powder including, as a main component, ceramic particles free from intragranular pores; preparing a second powder including, as a main component, ceramic particles having a Perovskite structure having an axis ratio c/a of 1.008 or less and including intragranular pores; producing an unsintered multi-layer unit that includes a capacitance forming unit including ceramic layers laminated along a first direction and including the first powder as a main component, and internal electrodes disposed between the ceramic layers, and a cover that covers the capacitance forming unit in the first direction; producing an unsintered ceramic body by forming a side margin on a side surface of the multi-layer unit, the side surface facing in a second direction orthogonal to the first direction, the side margin including the second powder as a main component and a higher content of silicon than a content of silicon in the ceramic layers; and sintering the ceramic body.

The side margin may be formed by attaching a ceramic sheet to the side surface.

In this configuration, it is possible to produce a multi-layer ceramic capacitor capable of suppressing the progress of cracks in the ridge and the side margin of the protective portion.

According to another embodiment of the present disclosure, there is provided a method of producing a multi-layer ceramic capacitor, the method including: preparing a first powder including, as a main component, ceramic particles free from intragranular pores; preparing a second powder including, as a main component, ceramic particles having a Perovskite structure having an axis ratio c/a of 1.008 or less and including intragranular pores; producing an unsintered ceramic body including a multi-layer unit including ceramic layers laminated along a first direction and including the first powder as a main component, internal electrodes disposed between the ceramic layers, and a side margin that covers the internal electrodes in a second direction orthogonal to the first direction, and a cover that covers the multi-layer unit in the first direction and includes the second powder as a main component and a higher content of silicon than a content of silicon in the ceramic layers; and sintering the ceramic body.

In this configuration, it is possible to produce a multi-layer ceramic capacitor capable of suppressing the progress of cracks in the ridge and the cover of the protective portion.

The second powder may be produced by a hydrothermal method.

The second powder may have a mean particle size of 5 nm or more and 500 nm or less.

In those configurations, it is possible to optimally form the second region including as a main component crystal grains including intragranular pores in the multi-layer ceramic capacitor.

The first powder may be produced by a solid-phase method.

In the multi-layer ceramic capacitor with this configuration, a large capacitance is easily obtained.

As described above, according to the present disclosure, it is possible to provide a multi-layer ceramic capacitor and a method of producing the multi-layer ceramic capacitor, which are capable of achieving miniaturization and an increase in capacitance while ensuring high durability.

These and other objects, features and advantages of the present invention will become more apparent in light of the following detailed description of embodiments thereof, as illustrated in the accompanying drawings.

It is to be understood that both the foregoing general description and the following detailed description are exemplary and explanatory, and are intended to provide further explanation of the invention as claimed.

DETAILED DESCRIPTION OF THE EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

I Overall Configuration of Multi-Layer Ceramic Capacitor 10

1. SCHEMATIC CONFIGURATION

Figure 1:
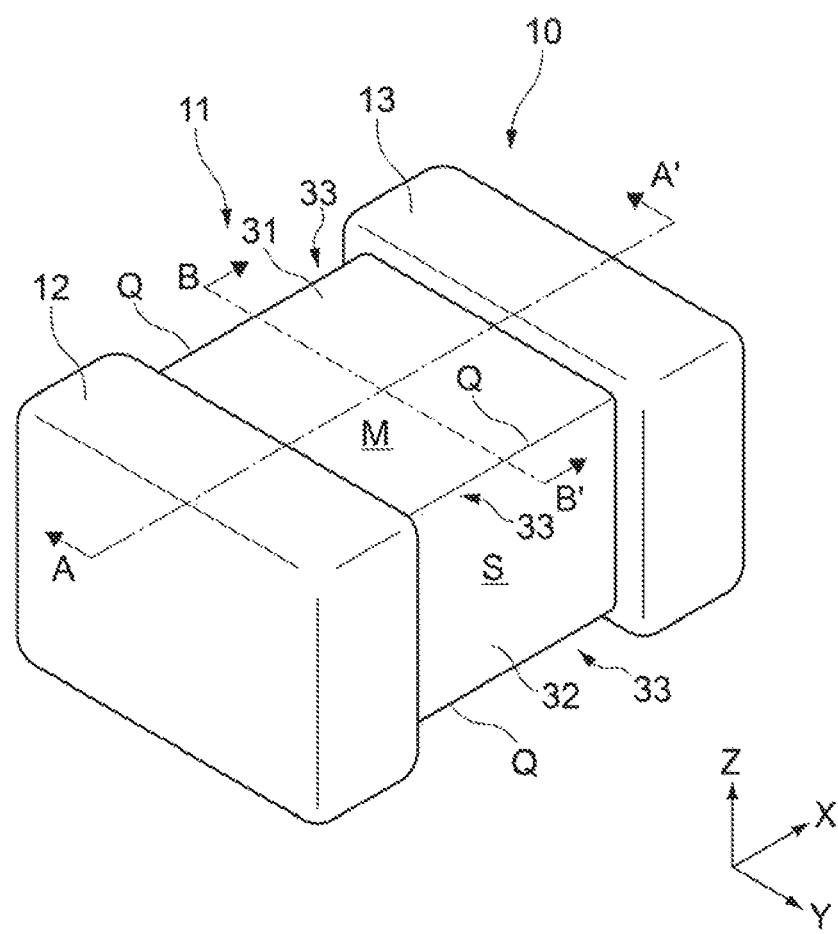
FIG. 1 is a perspective view of a multi-layer ceramic capacitor according to an embodiment of the present disclosure.
Figure 2:
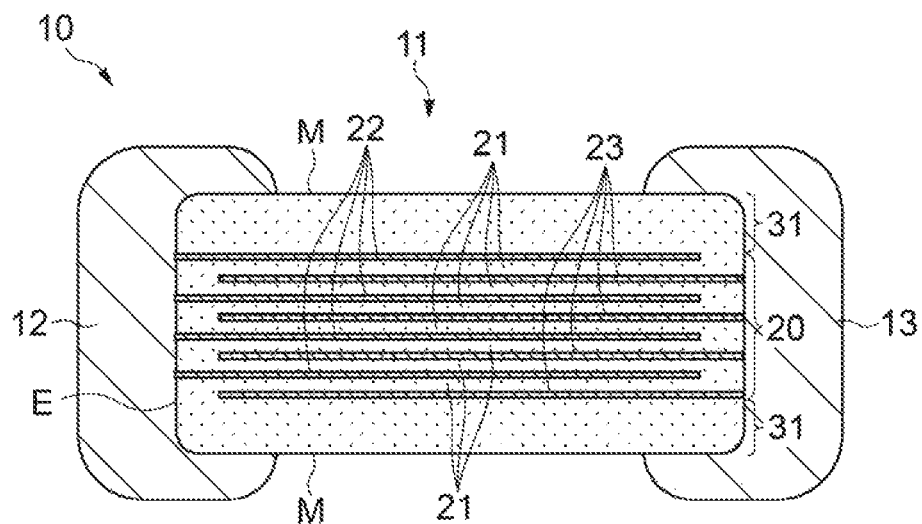
FIG. 2 is a cross-sectional view of the multi-layer ceramic capacitor taken along the A-A' line in FIG. 1.
Figure 3:
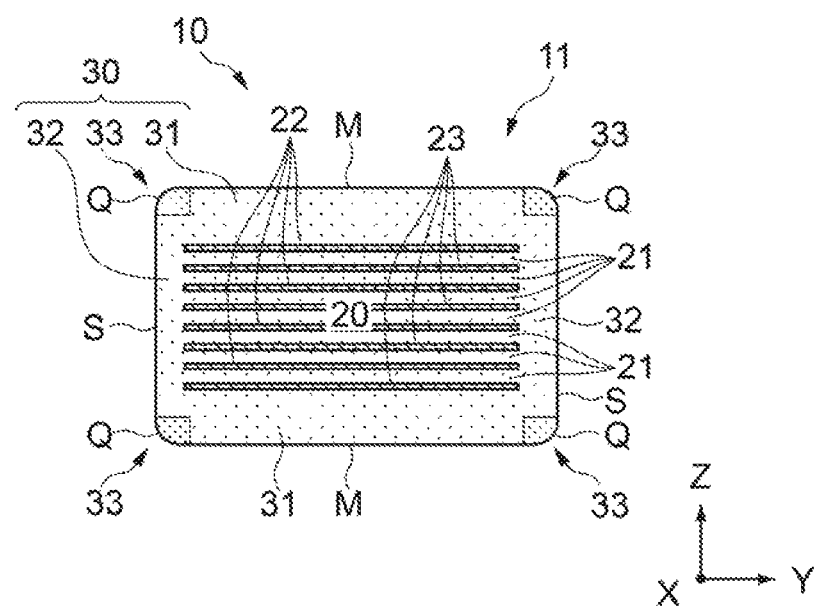
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 12, and a second external electrode 13. The first external electrode 12 is provided at one end of the ceramic body 11 in the X-axis direction, and the second external electrode 13 is provided at the other end of the ceramic body 11 in the X-axis direction. In other words, the first external electrode 12 and the second external electrode 13 face each other in the X-axis direction.

The ceramic body 11 has two end surfaces E facing in the X-axis direction, two side surfaces S facing in the Y-axis direction, two main surfaces M facing in the Z-axis direction, and connection portions Q connecting the main surfaces M and the side surfaces S to each other. Typically, the connection portions Q are configured as curved surfaces, which are formed by chamfering and bulge outward while extending in the X-axis direction.

The first external electrode 12 and the second external electrode 13 cover the respective end surfaces E of the ceramic body 11 and extend from the end surfaces E in the X-axis direction. The first external electrode 12 and the second external electrode 13 are spaced apart from each other on the side surfaces S, the main surfaces M, and the connection portions Q. With this configuration, both of the first external electrode 12 and the second external electrode 13 have U-shaped cross sections parallel to the X-Z plane and the X-Y plane.

The ceramic body 11 includes a capacitance forming unit 20 and a protective portion 30. The capacitance forming unit 20 is disposed at the center in the Y- and Z-axis directions. The protective portion 30 covers the capacitance forming unit 20 in the Y- and Z-axis directions and physically and electrically protects the capacitance forming unit 20. The protective portion 30 includes covers 31, side margins 32, and ridges 33.

The capacitance forming unit 20 includes a plurality of ceramic layers 21, a plurality of first internal electrodes 22, and a plurality of second internal electrodes 23. The ceramic layers 21 are sheet-like ceramic layers extending parallel to the X-Y plane and laminated along the Z-axis direction. The first and second internal electrodes 22 and 23 are alternately disposed along the Z-axis direction between the ceramic layers 21.

The first internal electrodes 22 are connected to the first external electrode 12 on one of the end surfaces E and are spaced apart from the other end surface E covered with the second external electrode 13. The second internal electrodes 23 are connected to the second external electrode 13 on the other end surface E and are spaced apart from the one end surface E covered with the first external electrode 12.

The covers 31 of the protective portion 30 cover the capacitance forming unit 20 from both sides in the Z-axis direction and constitute the main surfaces M of the ceramic body 11. The side margins 32 of the protective portion 30 cover the capacitance forming unit 20 from both sides in the Y-axis direction and constitute the side surfaces S of the ceramic body 11. The ridges 33 of the protective portion 30 constitute the connection portions Q of the ceramic body 11.

With the configuration described above, when a voltage is applied between the first external electrode 12 and the second external electrode 13 in the multi-layer ceramic capacitor 10, the voltage is applied to the ceramic layers 21 between the first internal electrodes 22 and the second internal electrodes 23. Thus, the multi-layer ceramic capacitor 10 stores charge corresponding to the voltage applied between the first external electrode 12 and the second external electrode 13.

The first and second internal electrodes 22 and 23 of the capacitance forming unit 20 are each formed of an electrically conductive material and function as internal electrodes of the multi-layer ceramic capacitor 10. Examples of the electrically conductive material include a metal material containing nickel (Ni), copper (Cu), palladium (Pd), platinum (Pt), silver (Ag), gold (Au), or an alloy of them.

A region including the ceramic layers 21 but excluding the first and second internal electrodes 22 and 23 in the capacitance forming unit 20 is formed of dielectric ceramics. In the multi-layer ceramic capacitor 10, in order to increase the capacitance of the capacitance forming unit 20, it is favorable to form the ceramic layers 21 by using dielectric ceramics having a high dielectric constant.

For that reason, in the multi-layer ceramic capacitor 10, a polycrystal of a barium titanate ($BaTiO_3$) based material, i.e., a polycrystal having a Perovskite structure containing barium (Ba) and titanium (Ti) is used as the dielectric ceramics having a high dielectric constant that forms the capacitance forming unit 20. This provides a large capacitance to the multi-layer ceramic capacitor 10.

It should be noted that the capacitance forming unit 20 may have a composition system of strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), titanium oxide ($TiO_2$), or the like.

The covers 31, the side margins 32, and the ridges 33 of the protective portion 30 are also formed of dielectric ceramics having a composition system similar to that of the ceramic body 11. In other words, in the multi-layer ceramic capacitor 10, the polycrystal of a barium titanate ($BaTiO_3$) based material is used as the dielectric ceramics constituting the protective portion 30.

It should be noted that the configuration of the multi-layer ceramic capacitor 10 according to this embodiment is not limited to the configuration shown in FIGS. 1 to 3 and can be changed as appropriate. For example, the number of first and second internal electrodes 22 and 23 and the thickness of the ceramic layer 21 can be determined as appropriate according to the size and performance expected for the multi-layer ceramic capacitor 10.

2. DETAILED CONFIGURATION

Figure 4:
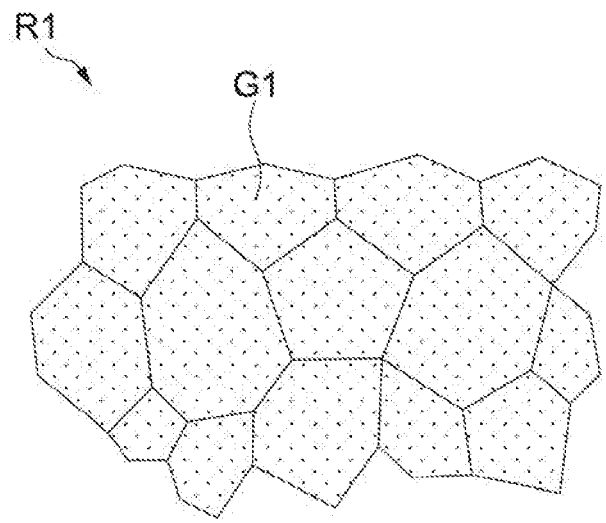
FIG. 4 is a partial cross-sectional view of a microstructure of a first region in the multi-layer ceramic capacitor.
Figure 5:
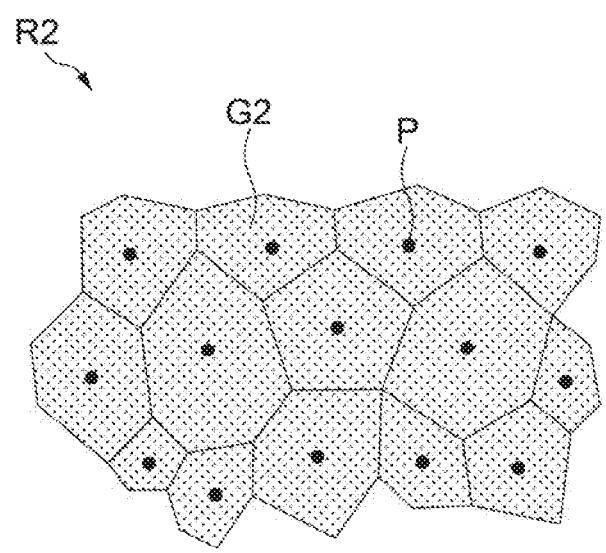
FIG. 5 is a partial cross-sectional view of a microstructure of a second region in the multi-layer ceramic capacitor.

In the ceramic body 11, the region formed of dielectric ceramics and excluding the first and second internal electrodes 22 and 23 includes a first region R1 and a second region R2, which are different from each other in microstructure. FIG. 4 is a partial cross-sectional view schematically showing the microstructure of the first region R1. FIG. 5 is a partial cross-sectional view schematically showing the microstructure of the second region R2.

The first region R1 includes a polycrystal including first crystal grains G1 as a main component, and the second region R2 includes a polycrystal including second crystal grains G2 as a main component. The first crystal grain G1 and the second crystal grain G2 have configurations different from each other. Specifically, the first crystal grains G1 constituting the first region R1 are free from intragranular pores P, and the second crystal grains G2 constituting the second region R2 include intragranular pores P.

The intragranular pores P, which are included in the second crystal grains G2 constituting the second region R2, are minute voids within the second crystal grains G2. In other words, the intragranular pore P is distinguished from a grain boundary pore, which is generally considered to be a void formed at a grain boundary, i.e., a boundary between adjacent crystal grains in a polycrystal.

Further, the second region R2 includes a higher content of silicon than the content of silicon in the first region R1, that is, contains an excessive amount of silicon. The second region R2 including an excessive amount of silicon obtains high mechanical strength at the grain boundaries between the second crystal grains G2 because of the segregation of silicon at the grain boundaries.

Meanwhile, unlike the second region R2, the first region R1 is free from the intragranular pores P or an excessive amount of silicon, which result in a decrease in capacitance. In the multi-layer ceramic capacitor 10, at least some of the ceramic layers 21 are constituted as the first region R1. With this configuration, the multi-layer ceramic capacitor 10 can ensure a large capacitance.

The second region R2, which will be described later in detail, has a configuration including the intragranular pores P or an excessive amount of silicon, which result in a decrease in capacitance. This configuration effectively suppresses the progress of cracks. In the multi-layer ceramic capacitor 10, the ridges 33 of the protective portion 30, which do not contribute to the formation of capacitance, are constituted as the second region R2. The ridges 33 are indicated by a dense dot pattern shown in at least FIG. 3.

The center of the protective portion 30 in the X-axis direction is exposed without being covered with the first and second external electrodes 12 and 13, and is thus susceptible to an external impact. In the multi-layer ceramic capacitor 10, at least part of the protective portion 30 is set to the second region R2, thus allowing the suppression of an insulation failure due to cracks, which are generated in the protective portion 30 and then reach the capacitance forming unit 20.

In particular, the ridges 33 each bulging outward in the protective portion 30 are susceptible to a strong external impact. In the multi-layer ceramic capacitor 10, at least the ridges 33 in the protective portion 30 are set to the second region R2, thus allowing the cracks generated in the protective portion 30 to be effectively prevented from reaching the capacitance forming unit 20.

In such a manner, the multi-layer ceramic capacitor 10 can suppress an insulation failure without a decrease in capacitance. Further, the multi-layer ceramic capacitor 10 suppresses the progress of cracks generated in the protective portion 30 and can thus achieve further miniaturization and an increase in capacitance by thinning the protective portion 30 more.

Figure 6:
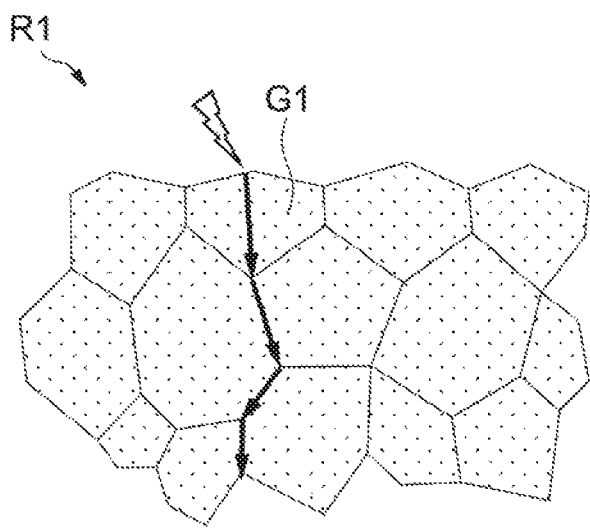
FIG. 6 is a diagram showing a progress path of a crack in the first region.
Figure 7:
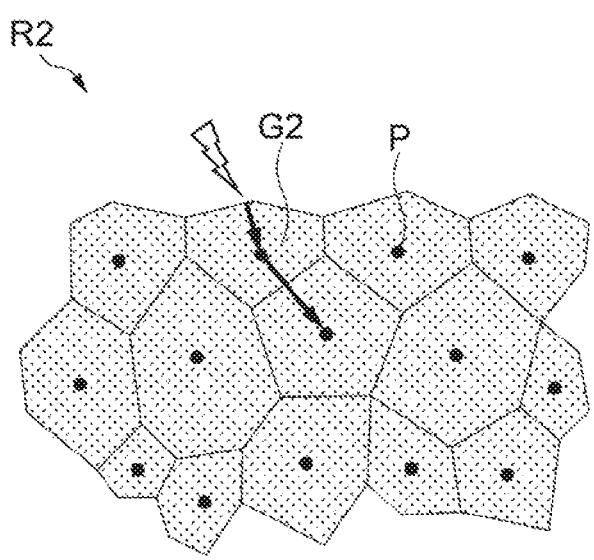
FIG. 7 is a diagram showing a progress path of a crack in the second region.

Hereinafter, the mechanism of the progress of cracks in the first region R1 and the second region R2 will be described with reference to FIGS. 6 and 7. FIGS. 6 and 7 are views each schematically showing, by arrows, the progress path of a crack generated in each of the first region R1 and the second region R2 due to an external impact. FIG. 6 shows the first region R1, and FIG. 7 shows the second region R2.

In the first region R1 shown in FIG. 6, a crack generated in a first crystal grain G1 due to an external impact goes forward to a grain boundary between first crystal grains G1 (or a grain-boundary triple point) and progresses while cutting through the grain boundaries having low mechanical strength. Thus, the crack generated in the first region R1 is prone to progress deeply through a path along the grain boundaries between the first crystal grains G1.

On the other hand, in the second region R2, a grain boundary between second crystal grains G2 has high mechanical strength due to the action of silicon as described above. With this configuration, in the second region R2, a crack generated in a second crystal grain G2 due to an external impact can be caused to progress through not a path along the grain boundaries between the second crystal grains G2 but a path that traces the intragranular pores P.

More specifically, in the second region R2 shown in FIG. 7, a crack generated in a second crystal grain G2 due to an external impact first goes forward to an intragranular pore P within the second crystal grain G2. The crack, which has reached the intragranular pore P, progresses toward an adjacent intragranular pore P. In other words, in the second region R2, the crack progresses while following adjacent intragranular pores P.

The crack progresses while using stress as a propulsion force, the stress being concentrated on the tip, of the crack, having a large curvature. In this regard, in the second region R2, an intragranular pore P having a small curvature has a function of hindering the progress of the crack. In other words, in the second region R2, when a crack reaches an intragranular pore P, the curvature sharply reduces at the tip of the crack and the stress is dispersed.

For that reason, in the second region R2, each time a crack reaches an intragranular pore P in the course of the progress, the stress at the tip of the crack, which is to be a propulsion force for the crack, is weakened. In other words, in the second region R2, the intragranular pore P within the second crystal grain G2 has a function of putting the brakes in the progress of the crack, and thus the crack becomes difficult to progress.

In the second region R2, in order to effectively suppress the progress of a crack along a grain boundary between the second crystal grains G2, the content of silicon is favorably set to 0.5 mol % or more. Meanwhile, in order to suppress an adverse impact of an excessive amount of silicon, such as a reduction in capacitance of the capacitance forming unit 20 due to the diffusion during sintering, the content of silicon is favorably set to 10 mol % or less.

The first region R1 includes the first crystal grains G1 substantially free from intragranular pores P, but may include a small amount of the second crystal grains G2 including the intragranular pores P. Further, the second region R2 includes the second crystal grains G2 substantially including the intragranular pores P, but may include a small amount of the first crystal grains G1 free from intragranular pores P.

The amount of the second crystal grains G2 including the intragranular pores P can be evaluated by an abundance rate of the intragranular pores. For example, the abundance rate of the intragranular pores can be obtained as a proportion of the crystal grains including voids each having a maximum diameter of 5 nm or more, which are observed as the intragranular pores P, among all the crystal grains observed in a predetermined region of an image of a cross section, the image being captured with a scanning electron microscope at a magnification of 5 million times.

In the second region R2, the second crystal grains G2 in which the intragranular pores P do not appear on a particular cross section are present at a predetermined proportion, among all the second crystal grains G2 including the intragranular pores P. Given this proportion, the abundance rate of the intragranular pores is 2.5% or more in the second region R2 including the second crystal grains G2 substantially including the intragranular pores P.

On the other hand, in the first region R1 including the first crystal grains G1 substantially free from intragranular pores P, the abundance rate of the intragranular pores is extremely near 0%. Specifically, in the first region R1, even if the second crystal grains G2 including the intragranular pores P are incidentally included, the abundance rate of the intragranular pores is suppressed to be 0.001% or less.

II Multi-Layer Ceramic Capacitor 10a According to First Configuration Example

1. Overall Configuration

Figure 8:
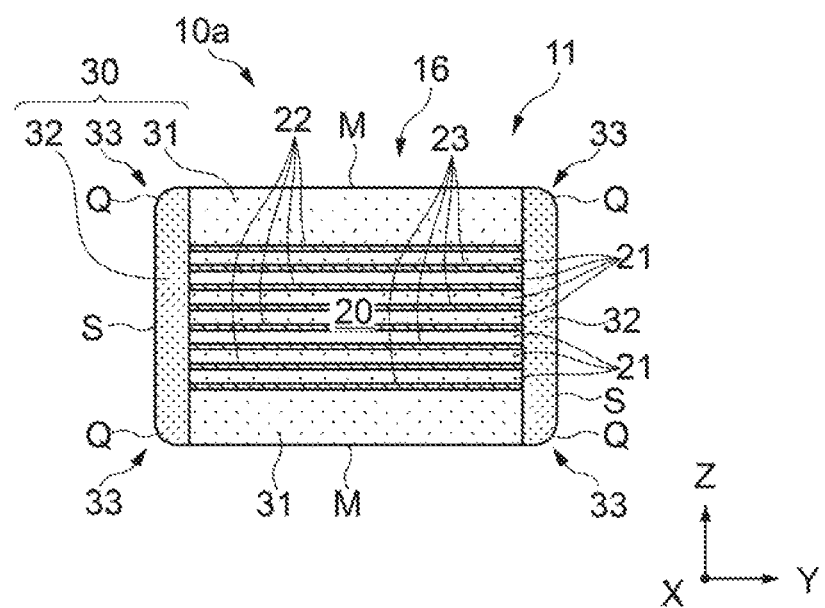
FIG. 8 is a cross-sectional view of a first configuration example of the multi-layer ceramic capacitor.

FIG. 8 is a view of a multi-layer ceramic capacitor 10a according to a first configuration example of the embodiment described above. The multi-layer ceramic capacitor 10a has a configuration in which side margins 32, which are formed continuously with ridges 33, are provided to the side surfaces of a multi-layer unit 16, the side surfaces facing each other in the Y-axis direction. The multi-layer unit 16 includes a capacitance forming unit 20 and covers 31.

In a protective portion 30 of the multi-layer ceramic capacitor 10a, the side margins 32 are also constituted as the second region R2 together with the ridges 33, as shown by a dense dot pattern in FIG. 8. With this configuration, in the protective portion 30, the progress of cracks can be suppressed not only in the ridges 33 but also in the side margins 32. Further, the multi-layer unit 16 is constituted as the first region R1.

In the multi-layer ceramic capacitor 10a, since the progress of cracks in the side margins 32 is suppressed, the side margins 32 can be further thinned. Specifically, in the multi-layer ceramic capacitor 10a, an insulation failure can be prevented from occurring even if a dimension of the side margin 32 in the Y-axis direction is set to 30 μm or less.

2. Production Method

Figure 9:
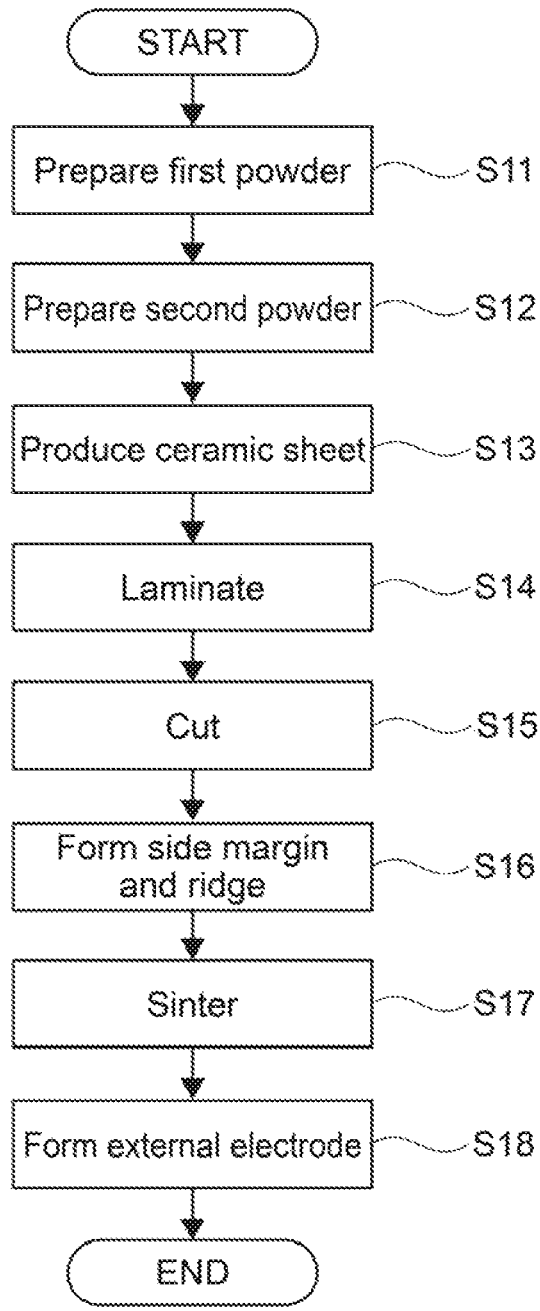
FIG. 9 is a flowchart showing a production method of the first configuration example.
Figure 10:
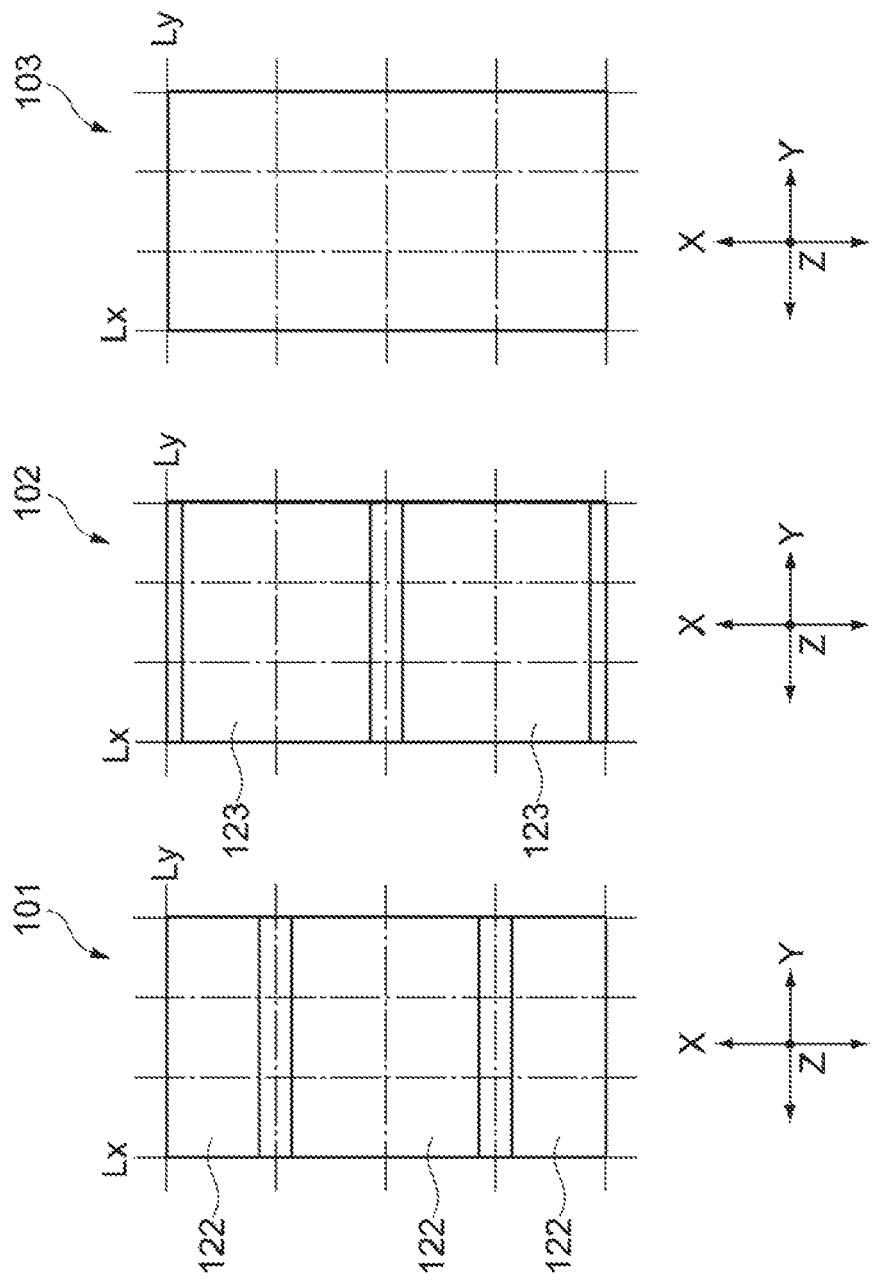
FIGS. 10A, 10B, and 10C are each a plan view showing a production process of the first configuration example.

FIG. 9 is a flowchart showing a method of producing the multi-layer ceramic capacitor 10a. FIGS. 10 to 14 are views each showing a production process of the multi-layer ceramic capacitor 10a. Hereinafter, the method of producing the multi-layer ceramic capacitor 10a will be described according to FIG. 9 with reference to FIGS. 10 to 14 as appropriate.

2.1 Step S11: Preparation of First Powder

In Step S11, a first powder that is a ceramic powder for forming the multi-layer unit 16 is prepared. The first powder is a solid-phase powder produced by a method other than a hydrothermal method, and in this embodiment, produced by a solid-phase method. For example, the solid-phase powder of barium titanate is obtained when a mixed powder of titanium oxide and barium carbonate is heated to cause a solid-phase reaction.

2.2 Step S12: Preparation of Second Powder

In Step S12, a second powder that is a ceramic powder for forming the side margins 32 and the ridges 33 of the protective portion 30 is prepared. The second powder is a hydrothermal powder produced by a hydrothermal method. The hydrothermal powder produced by the hydrothermal method mainly contains ceramic particles including intragranular pores P.

Thus, the side margins 32 and the ridges 33, which are formed of the hydrothermal powder, become polycrystals including, as a main component, the second crystal grains G2 including the intragranular pores P resulting from the hydrothermal powder after sintering. For example, the hydrothermal powder of barium titanate is obtained when titanium oxide and barium hydroxide are synthesized in a pressure vessel containing hot water by a hydrothermal method.

Since the hydrothermal method allows the ceramic powder to be produced at low cost, using the hydrothermal powder to form the side margins 32 and the ridges 33 can lead to a reduction in manufacturing cost of the multi-layer ceramic capacitor 10a. Further, the hydrothermal powder is obtained as a fine powder formed of substantially spherical particles having a uniform particle size and, for example, has a mean particle size of 5 nm or more and 500 nm or less.

The crystallinity of the Perovskite structure can be evaluated by an axis ratio c/a, which is a ratio of the length of the c-axis to the length of the a-axis in a unit lattice. In an ideal crystalline structure, the axis ratio c/a is approximately 1.01. In the hydrothermal powder, the axis ratio c/a is 1.008 or less. The axis ratio c/a can be calculated from a spectrum obtained by X-ray diffraction, for example.

2.3 Step S13: Production of Ceramic Sheet

In Step S13, first ceramic sheets 101 and second ceramic sheets 102 for forming the capacitance forming unit 20, third ceramic sheets 103 for forming the covers 31, and fourth ceramic sheets 104 (now shown) for forming the side margins 32 and the ridges 33 are produced.

The first, second, third, and fourth ceramic sheets 101, 102, 103, and 104 include a ceramic powder as a main component and are formed as unsintered dielectric green sheets that are formed into sheets by using a solvent and a binder. For the formation of the first, second, third, and fourth ceramic sheets 101, 102, 103, and 104, a roll coater or a doctor blade can be used, for example.

More specifically, the first, second, and third ceramic sheets 101, 102, and 103 forming the multi-layer unit 16 are produced using the first powder, which is the solid-phase powder prepared in Step S11. Meanwhile, the fourth ceramic sheets 104 forming the side margins 32 and the ridges 33 are produced using the second powder, which is the hydrothermal powder prepared in Step S12.

As described above, the hydrothermal powder is a fine powder formed of substantially spherical particles having a uniform particle size. Thus, the hydrothermal powder is likely to be dispersed in a solvent. Further, slurry of the hydrothermal powder dispersed in the solvent and the binder is flexibly deformable and thus has high formability. Thus, high-quality fourth ceramic sheets 104 are obtained by using the hydrothermal powder.

Further, the fourth ceramic sheets 104 for forming the side margins 32 and the ridges 33 have a higher content of silicon than the content of silicon in the first, second, and third ceramic sheets 101, 102, and 103. Using the hydrothermal powder having high sinterability for the fourth ceramic sheets 104 and providing a large amount of silicon, which easily forms a liquid phase, to the fourth ceramic sheets 104 improves the sinterability of the side margins 32 and the ridges 33.

FIGS. 10A, 10B, and 10C are plan views of the first, second, and third ceramic sheets 101, 102, and 103, respectively. At this stage, the first, second, and third ceramic sheets 101, 102, and 103 are each formed as a large-sized sheet that is not singulated. FIGS. 10A, 10B, and 10C each show cutting lines Lx and Ly to be used when the sheets are singulated into the multi-layer units 16. The cutting lines Lx are parallel to the X axis, and the cutting lines Ly are parallel to the Y axis.

As shown in FIGS. 10A, 10B, and 10C, unsintered first internal electrodes 122 corresponding to the first internal electrodes 22 are formed on the first ceramic sheet 101, and unsintered second internal electrodes 123 corresponding to the second internal electrodes 23 are formed on the second ceramic sheet 102. It should be noted that no internal electrodes are formed on the third ceramic sheet 103 corresponding to the cover 31.

The first internal electrodes 122 and the second internal electrodes 123 can be formed by applying an optional electrically conductive paste to the first ceramic sheets 101 and the second ceramic sheets 102, respectively. The method of applying the electrically conductive paste can be optionally selected from well-known techniques. For example, for the application of the electrically conductive paste, a screen printing method or a gravure printing method can be used.

In the first and second internal electrodes 122 and 123, gaps are formed in the X-axis direction along the cutting lines Ly for every other cutting line Ly. The gaps of the first internal electrodes 122 and the gaps of the second internal electrodes 123 are alternately disposed in the X-axis direction. In other words, a cutting line Ly passing through a gap between the first internal electrodes 122 and a cutting line Ly passing through a gap between the second internal electrodes 123 are alternately disposed.

2.4 Step S14: Lamination

Figure 11:
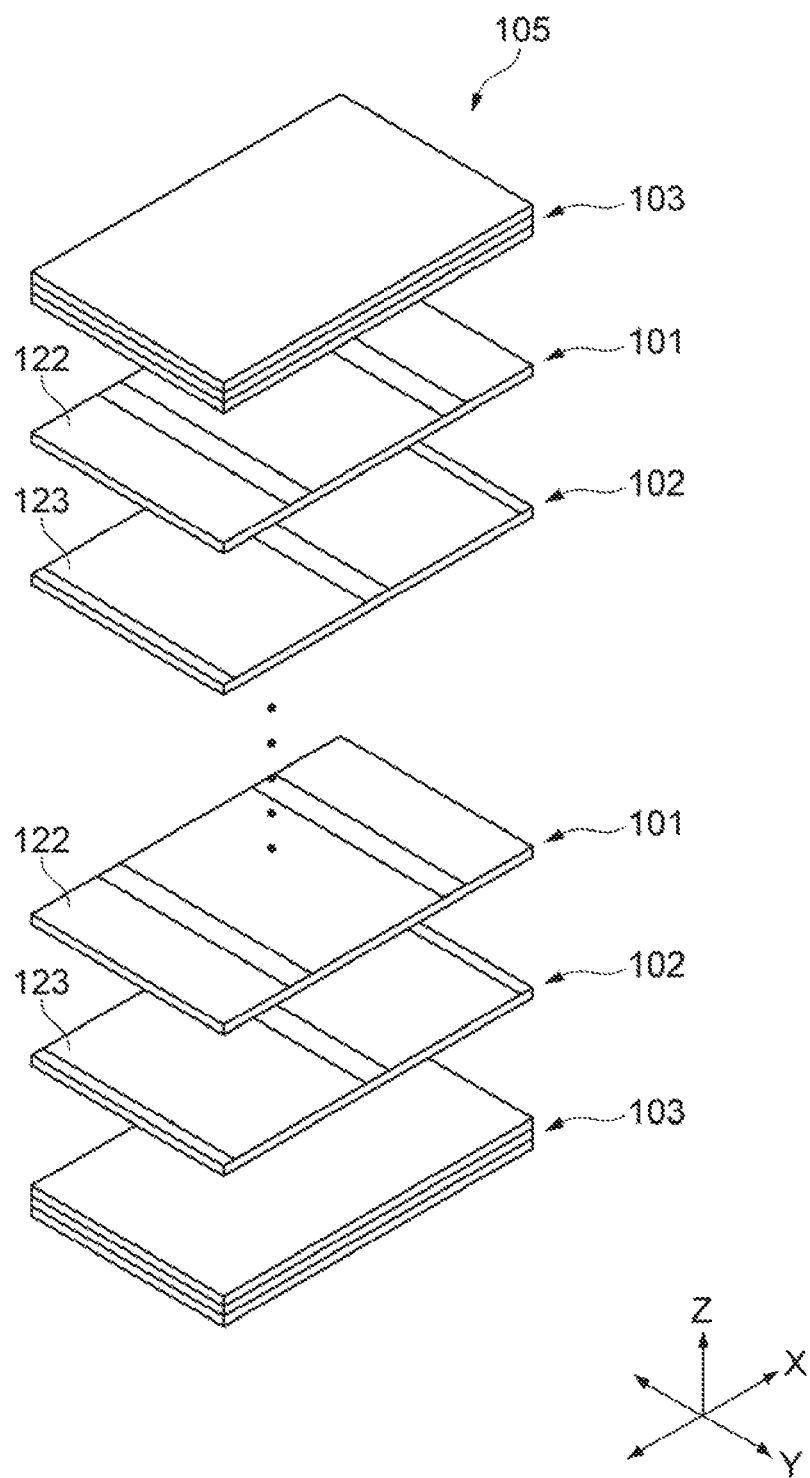
FIG. 11 is a perspective view showing the production process of the first configuration example.

In Step S14, the first, second, and third ceramic sheets 101, 102, and 103 prepared in Step S13 are laminated as shown in FIG. 11, to produce a multi-layer sheet 105. In the multi-layer sheet 105, the first ceramic sheets 101 and the second ceramic sheets 102 that correspond to the capacitance forming unit 20 are alternately laminated in the Z-axis direction.

Further, in the multi-layer sheet 105, the third ceramic sheets 103 corresponding to the covers 31 are laminated on the uppermost and lowermost surfaces of the first and second ceramic sheets 101 and 102 alternately laminated in the Z-axis direction. It should be noted that in the example shown in FIG. 11, three third ceramic sheets 103 are laminated on each of the uppermost and lowermost surfaces of the laminated first and second ceramic sheets 101 and 102, but the number of third ceramic sheets 103 can be changed as appropriate.

The multi-layer sheet 105 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is favorably used. This makes it possible to obtain a high-density multi-layer sheet 105.

2.5 Step S15: Cutting

Figure 12:
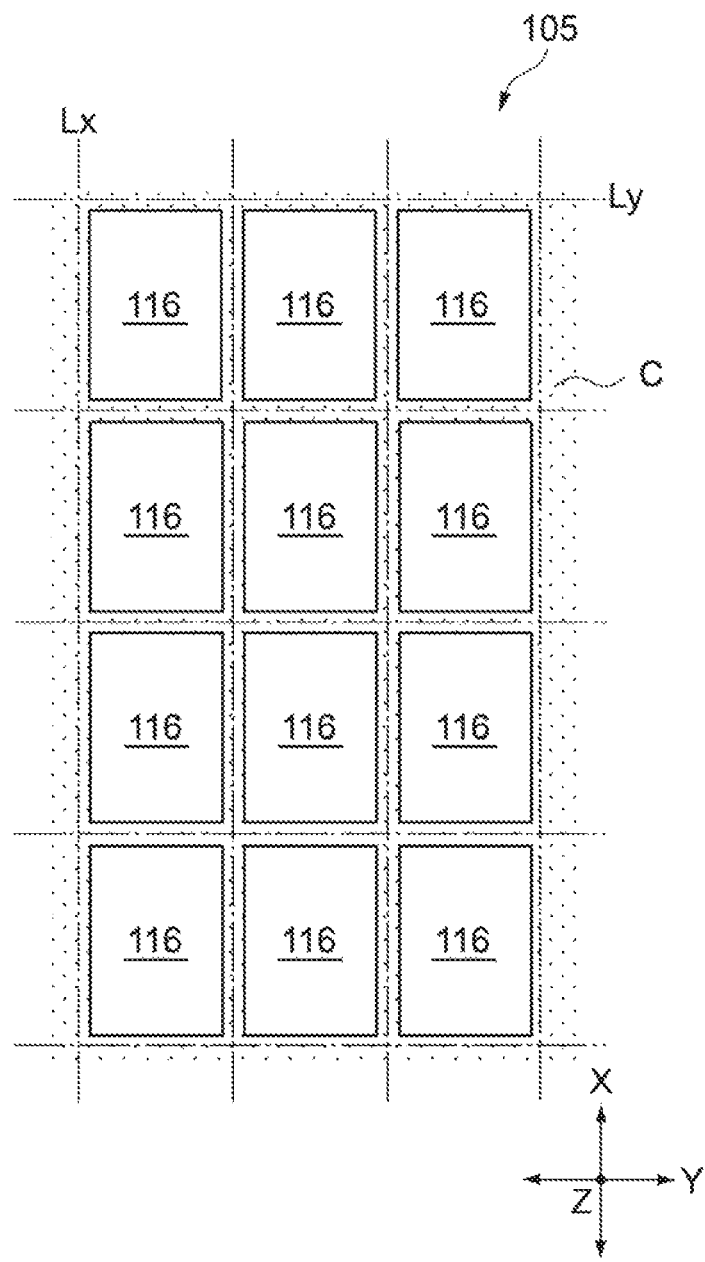
FIG. 12 is a plan view showing the production process of the first configuration example.

In Step S15, the multi-layer sheet 105 obtained in Step S14 is cut along the cutting lines Lx and Ly as shown in FIG. 12, to produce an unsintered multi-layer unit 116. The multi-layer unit 116 corresponds to a multi-layer unit 16 to be obtained after sintering. For cutting of the multi-layer sheet 105, for example, a rotary blade or a push-cutting blade can be used.

More specifically, the multi-layer sheet 105 is cut along the cutting lines Lx and Ly while being held by a holding member C. The multi-layer sheet 105 is singulated, and the multi-layer units 116 are thus obtained. At that time, the holding member C is not cut, and thus the multi-layer units 116 are connected via the holding member C.

Figure 13:
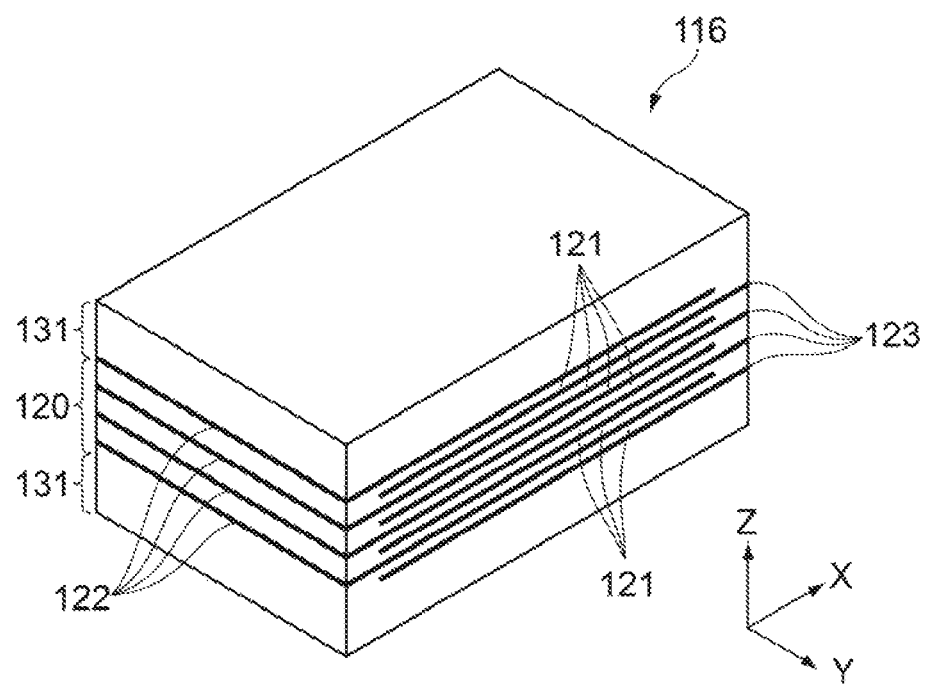
FIG. 13 is a perspective view showing the production process of the first configuration example.

FIG. 13 is a perspective view of the multi-layer unit 116 obtained in Step S15. The multi-layer unit 116 includes a capacitance forming unit 120 and covers 131. In the multi-layer unit 116, the first and second internal electrodes 122 and 123 are exposed on the cut surfaces, i.e., both side surfaces facing in the Y-axis direction. Ceramic layers 121 are formed between the first and second internal electrodes 122 and 123.

2.6 Step S16: Formation of Side Margin and Ridge

In Step S16, the fourth ceramic sheets 104 prepared in Step S13 are attached to the multi-layer unit 116 obtained in Step S15, thus forming unsintered side margins 132 and unsintered ridges 133. This provides an unsintered ceramic body 111 shown in FIG. 14.

More specifically, in Step S16, the fourth ceramic sheets 104 are attached to both the side surfaces of the multi-layer unit 116 obtained in Step S15, the side surfaces being cut surfaces and face each other in the Y-axis direction. Thus, in Step S16, it is favorable to detach the multi-layer unit 116 from the holding member C in advance and rotate the multi-layer unit 116 by 90 degrees.

Figure 14:
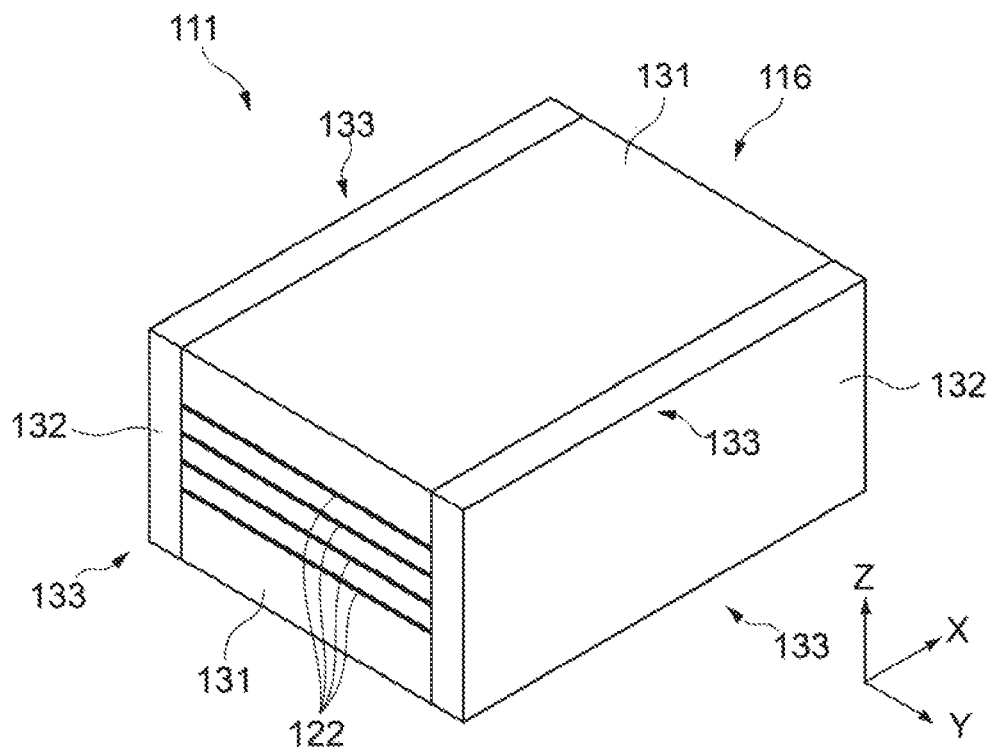
FIG. 14 is a perspective view showing the production process of the first configuration example.

In Step S16, for example, the fourth ceramic sheets 104, each of which is cut to fit the outer shape of the side surface of the multi-layer unit 116, can be attached to both the side surfaces of the multi-layer unit 116. Thus, the fourth ceramic sheets 104 attached to both the side surfaces of the multi-layer unit 116 become the unsintered side margins 132 and the unsintered ridges 133 as shown in FIG. 14.

The fourth ceramic sheet 104 including as a main component the hydrothermal powder, which is a fine powder formed of particles having a uniform particle size, is flexibly deformable while following the minute irregularities of the side surface of the multi-layer unit 116, and can come into close contact with the side surface of the multi-layer unit 116 along with the side surface. Thus, in the ceramic body 111, the side margins 132 and the ridges 133 are less likely to be peeled off from the multi-layer unit 116.

It should be noted that the method of forming the unsintered side margins 132 and ridges 133 is not limited to the method described above. For example, the fourth ceramic sheet 104 may be cut to fit the outline of the side surface of the multi-layer unit 116 after being attached to the side surface of the multi-layer unit 116. Furthermore, the fourth ceramic sheet 104 may be punched out by the side surface of the multi-layer unit 116.

2.7 Step S17: Sintering

In Step S17, the unsintered body 111 obtained in Step S16 is sintered to produce the ceramic body 11 of the multi-layer ceramic capacitor 10a shown in FIG. 8. In other words, in Step S17, the multi-layer unit 116 becomes the multi-layer unit 16, the side margins 132 become the side margins 32, and the ridges 133 become the ridges 33.

A sintering temperature in Step S17 can be determined on the basis of a sintering temperature for the ceramic body 111. For example, when a barium titanate based material is used as dielectric ceramics, the sintering temperature can be set to approximately 1,000° C. to 1,300° C. Further, sintering can be performed in a reduction atmosphere or a low-oxygen partial pressure atmosphere, for example.

In the multi-layer ceramic capacitor 10a, as described above, since the side margins 132 and the ridges 133 are in close contact with the multi-layer unit 116 without gaps, gaps are difficult to occur between the side margins 32 and the ridges 33, and the multi-layer unit 16 in the ceramic body 11 to be obtained after sintering. This provides higher moisture resistance to the multi-layer ceramic capacitor 10a.

2.8 Step S18: Formation of External Electrode

In Step S18, the first external electrode 12 and the second external electrode 13 are formed on the ceramic body 11 obtained in Step S17, to produce the multi-layer ceramic capacitor 10a shown in FIG. 8. In Step S18, for example, base films, intermediate films, and surface films constituting the first and second external electrodes 12 and 13 are formed on the end surfaces of the ceramic body 11 that face in the X-axis direction.

More specifically, in Step S18, first, an unsintered electrode material is applied so as to cover both the end surfaces of the ceramic body 11 that face in the X-axis direction. The applied unsintered electrode materials are subjected to baking in a reduction atmosphere or a low-oxygen partial pressure atmosphere, for example, to form base films of the first and second external electrodes 12 and 13 on the ceramic body 11.

On the base films of the first and second external electrodes 12 and 13, which are baked onto the ceramic body 11, intermediate films of the first and second external electrodes 12 and 13 are then formed, and surface films of the first and second external electrodes 12 and 13 are further formed. For the formation of the intermediate films and the surface films of the first and second external electrodes 12 and 13, for example, plating such as electrolytic plating can be used.

It should be noted that part of the processing in Step S18 may be performed before Step S17. For example, before Step S17, the unsintered electrode material may be applied to both the end surfaces of the unsintered ceramic body 111 that face in the X-axis direction. This makes it possible to simultaneously perform sintering of the unsintered ceramic body 111 and baking of the unsintered electrode material in Step S17.

3. EXAMPLE

Hereinafter, Example of the multi-layer ceramic capacitor 10a according to the first configuration example will be described. In this Example, 1,000 samples of the multi-layer ceramic capacitor 10a were produced by using the production method described above. In those samples, a dimension in the X-axis direction was set to 1 mm, and dimensions in the Y- and Z-axis directions were each set to 0.5 mm.

Further, 1,000 samples of the multi-layer ceramic capacitor 10a according to Comparative Example were also produced. The samples according to Comparative Example were produced by a method similar to that for the samples according to Example, without using the second powder that is the hydrothermal powder. In other words, the samples according to Comparative Example are different from the samples according to Example in that the side margins and the ridges in the protective portion are the first region R1.

A drop test was performed on each of the samples according to Example and Comparative Example by dropping each sample on a flat plate from a height of 30 cm. Further, an electrical resistance was measured for each of the samples before and after the drop test was performed. After the drop test, a sample having an electrical resistance, which was reduced by two or more digits from the electrical resistance obtained before the drop test, was determined as a sample with a short circuit failure.

In the samples according to Example, no short circuit failure occurred in all of the 1,000 samples. Meanwhile, a short circuit failure occurred in three samples of the 1,000 samples according to Comparative Example. In such a manner, it was confirmed that the samples according to Example have higher resistance to an external impact than the resistance of the samples according to Comparative Example.

III Multi-Layer Ceramic Capacitor 10b According to Second Configuration Example

1. Overall Configuration

Figure 15:
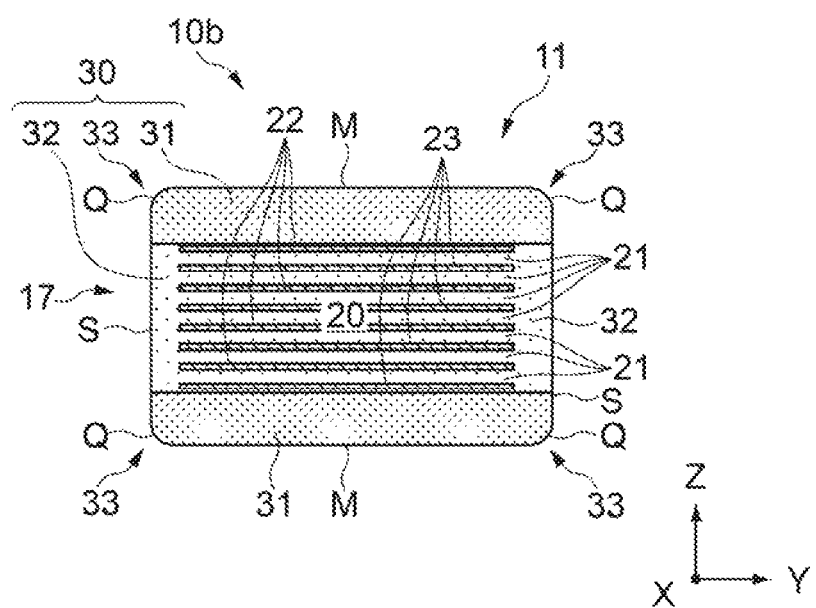
FIG. 15 is a cross-sectional view of a second configuration example of the multi-layer ceramic capacitor.

FIG. 15 is a view of a multi-layer ceramic capacitor 10b according to a second configuration example of the embodiment described above. The multi-layer ceramic capacitor 10b has a configuration in which covers 31, which are formed continuously with ridges 33, are provided to the upper portion and the lower portion of a multi-layer unit 17 in the Z-axis direction. The multi-layer unit 17 includes a capacitance forming unit 20 and side margins 32.

In a protective portion 30 of the multi-layer ceramic capacitor 10b, the covers 31 are also constituted as the second region R2 together with the ridges 33, as shown by a dense dot pattern in FIG. 15. With this configuration, in the protective portion 30, the progress of cracks can be suppressed not only in the ridges 33 but also in the covers 31. Further, the multi-layer unit 17 is constituted as the first region R1.

2. Production Method

Figure 16:
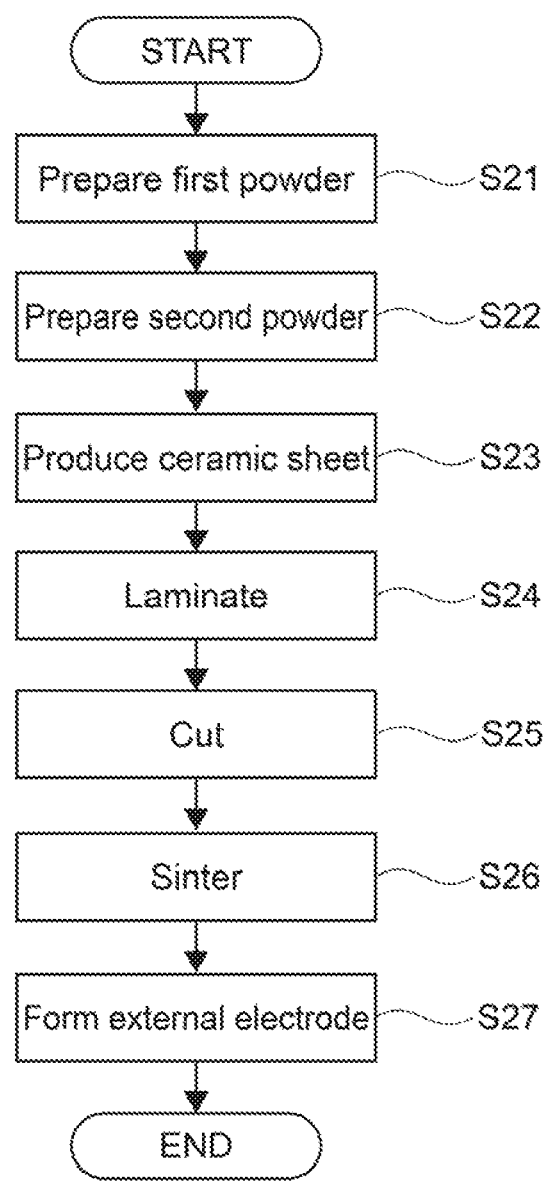
FIG. 16 is a flowchart showing a production method of the second configuration example.
Figure 18:
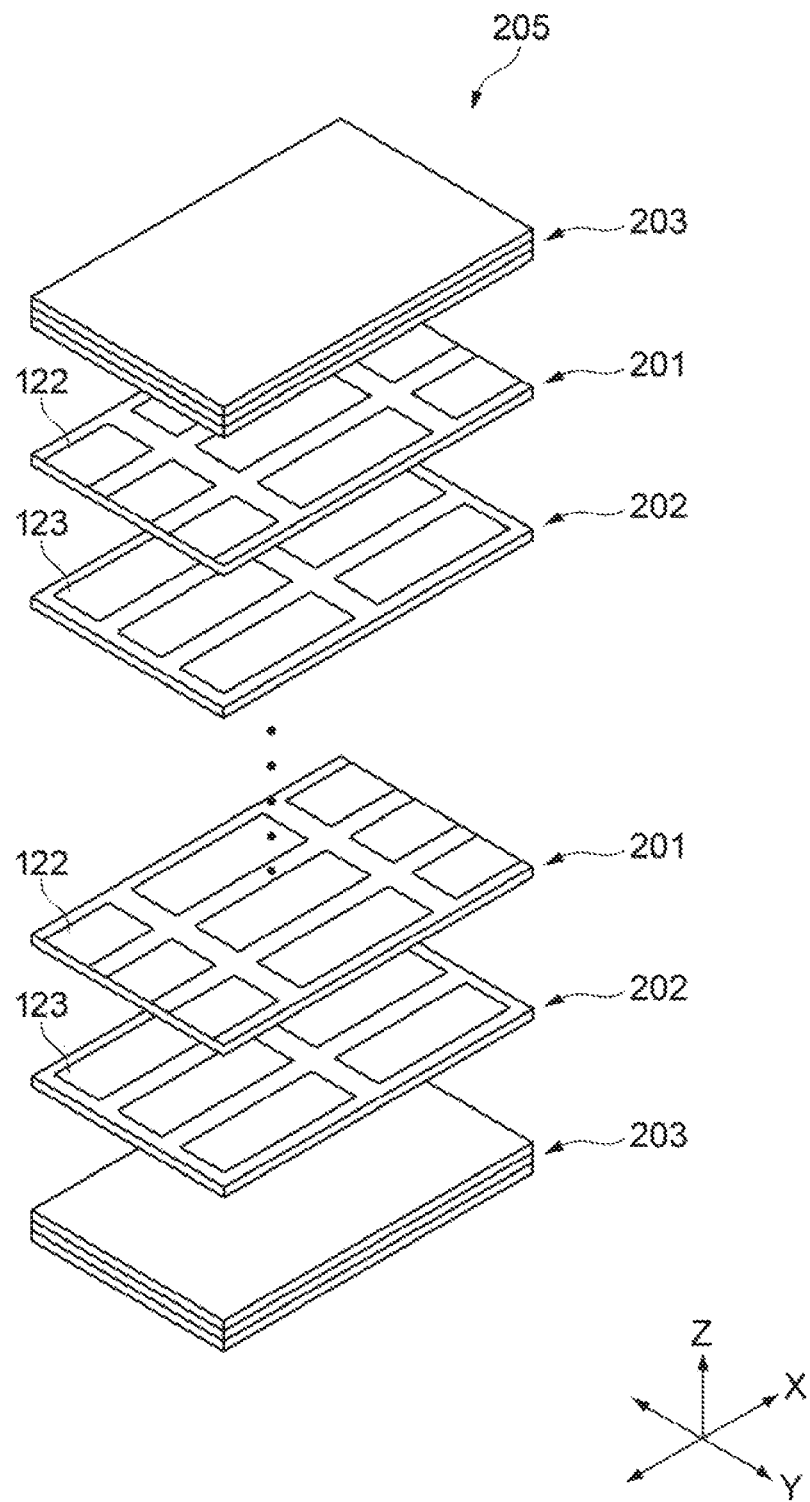
FIG. 18 is a perspective view showing the production process of the second configuration example.
Figure 19:
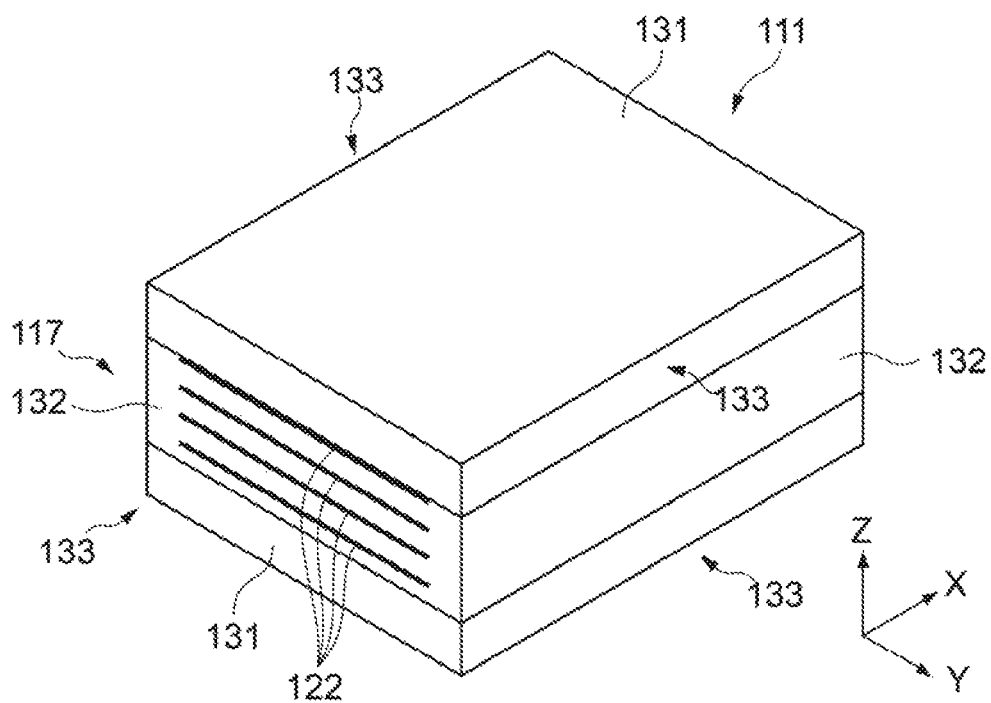
FIG. 19 is a perspective view showing the production process of the second configuration example.

FIG. 16 is a flowchart showing a method of producing the multi-layer ceramic capacitor 10b. FIGS. 17 to 19 are views each showing a production process of the multi-layer ceramic capacitor 10b. Hereinafter, the method of producing the multi-layer ceramic capacitor 10b will be described according to FIG. 16 with reference to FIGS. 17 to 19 as appropriate.

2.1 Steps S21 and S22: Preparation of First Powder and Second Powder

In Step S21 (preparation of first powder) and Step S22 (preparation of second powder), a first powder for forming the first region R1 and a second powder for forming the second region R2 are prepared in a manner similar to Step S11 (preparation of first powder) and Step S12 (preparation of second powder) according to the first configuration example described above.

2.2 Step S23: Production of Ceramic Sheet

In Step S23, first ceramic sheets 201 and second ceramic sheets 202 for forming the multi-layer unit 17, and third ceramic sheets 203 for forming the covers 31 and the ridges 33 are produced. The first, second, and third ceramic sheets 201, 202, and 203 can be formed in a manner similar to the first to fourth ceramic sheets 101 to 104 according to the first configuration example.

The first and second ceramic sheets 201 and 202 are formed using the first powder, which is a solid-phase powder, in a manner similar to the first, second, and third ceramic sheets 101, 102, and 103 according to the first configuration example. The third ceramic sheets 203 are formed using the second powder, which is a hydrothermal powder, in a manner similar to the fourth ceramic sheets 104 according to the first configuration example, and are formed using an excessive amount of silicon.

Figures 17A, 17B, 17C:
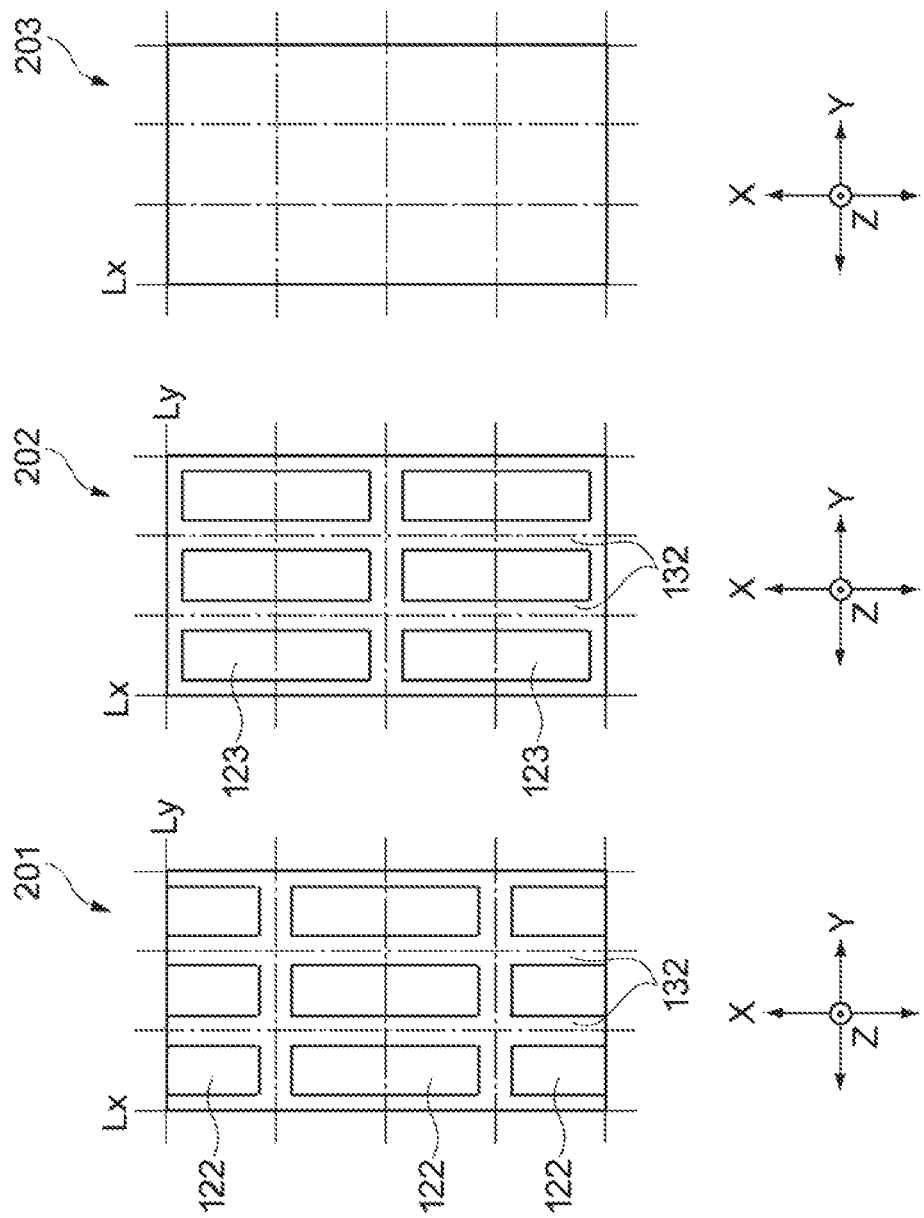
FIGS. 17A, 17B, and 17C are each a plan view showing a production process of the second configuration example.

FIGS. 17A, 17B, and 17C are plan views of the first, second, and third ceramic sheets 201, 202, and 203, respectively. Using an electrically conductive paste, unsintered first internal electrodes 122 corresponding to the first internal electrodes 22 are patterned on the first ceramic sheet 201, and unsintered second internal electrodes 123 corresponding to the second internal electrodes 23 are patterned on the second ceramic sheet 202, at intervals for forming unsintered side margins 132 disposed between the individual internal electrodes.

2.3 Step S24: Lamination

In Step S24, the first, second, and third ceramic sheets 201, 202, and 203 prepared in Step S23 are laminated as shown in FIG. 18, to produce a multi-layer sheet 205. In the multi-layer sheet 205, the first ceramic sheets 201 and the second ceramic sheets 202 that correspond to the multi-layer unit 17 are alternately laminated in the Z-axis direction.

2.4 Step S25: Cutting

In Step S25, the multi-layer sheet 205 obtained in Step S24 is cut to produce an unsintered ceramic body 111 shown in FIG. 19. Thus, a multi-layer unit 117 corresponding to the multi-layer unit 17, covers 131 corresponding to the covers 31, and ridges 133 corresponding to the ridges 33 are formed in the unsintered ceramic body 111.

2.5 Step S26: Sintering

In Step S26, the unsintered ceramic body 111 obtained in Step S25 is sintered to produce the ceramic body 11 of the multi-layer ceramic capacitor 10b shown in FIG. 15. Sintering of the ceramic body 111 according to the second configuration example can be performed in a manner similar to Step S17 of the first configuration example.

2.6 Step S27: Formation of External Electrode

In Step S27, the first external electrode 12 and the second external electrode 13 are formed on the ceramic body 11 obtained in Step S26, to produce the multi-layer ceramic capacitor 10b shown in FIG. 15. The first external electrode 12 and the second external electrode 13 according to the second configuration example can be formed in a manner similar to Step S18 of the first configuration example.

IV Other Embodiments

While the embodiment of the present disclosure has been described hereinabove, the present disclosure is not limited to the embodiment described above, and it should be appreciated that the present disclosure may be variously modified.

Figure 20:
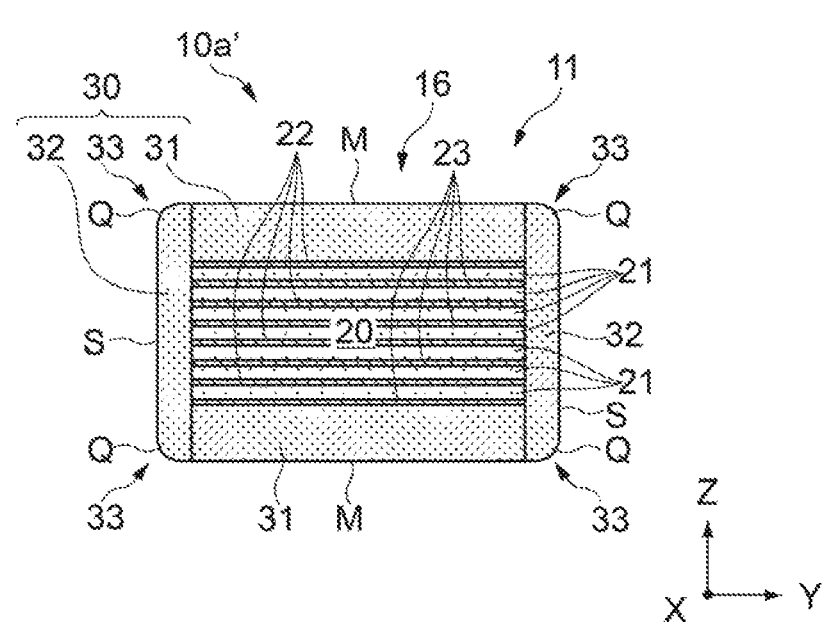
FIG. 20 is a cross-sectional view of another configuration example of the multi-layer ceramic capacitor.

For example, like a multi-layer ceramic capacitor 10a' shown in FIG. 20, in the multi-layer ceramic capacitor 10a according to the first configuration example, the covers 31 may also be configured as the second region R2 such that the protective portion 30 may be configured as the second region R2 as a whole. This can suppress the progress of cracks over the entire protective portion 30.

The configuration of the multi-layer ceramic capacitor 10a' shown in FIG. 20 is feasible if the third ceramic sheets 103 for forming the covers 31 are produced using the second powder, which is the hydrothermal powder prepared in Step S12. With this configuration, the sintered covers 31 become polycrystals including, as a main component, the second crystal grains G2 including the intragranular pores P.

Further, in order to form the side margins 132 and the ridges 133 according to the first configuration example, for example, ceramic slurry may be used instead of the ceramic sheets. In this case, for example, the side surfaces of the multi-layer unit 116 are immersed into ceramic slurry including the hydrothermal powder as a main component, and thus the side margins 132 and the ridges 133 can be formed.

Moreover, the capacitance forming unit 20 may be divided into capacitance forming units in the Z-axis direction. In this case, in each capacitance forming unit 20, the first internal electrodes 22 and the second internal electrodes 23 only need to be alternately disposed along the Z-axis direction. In a portion where the capacitance forming units 20 are next to each other, the first internal electrodes 22 or the second internal electrodes 23 may be continuously disposed.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A multi-layer ceramic capacitor, comprising:
   a first region including a polycrystal including, as a main component, crystal grains free from intragranular pores;
   a second region that includes a polycrystal including, as a main component, crystal grains including intragranular pores and includes a higher content of silicon than a content of silicon in the first region;
   a capacitance forming unit including
      ceramic layers laminated along a first direction, and
      internal electrodes disposed between the ceramic layers; and
   a protective portion including
      a cover that covers the capacitance forming unit and constitutes a main surface facing in the first direction,
      a side margin constituting a side surface facing in a second direction orthogonal to the first direction, and
      a ridge constituting a connection portion, the connection portion connecting the main surface and the side surface to each other, wherein
   the ceramic layers include the first region, and
   the ridge includes the second region.

2. The multi-layer ceramic capacitor according to claim 1, wherein
   the content of silicon of the second region is 0.5 mol % or more.

3. The multi-layer ceramic capacitor according to claim 1, wherein
   the side margin includes the second region.

4. The multi-layer ceramic capacitor according to claim 3, wherein
   a dimension of the side margin in the second direction is 30 μm or less.

5. The multi-layer ceramic capacitor according to claim 3, wherein
the protective portion includes the second region over the entire protective portion.

6. The multi-layer ceramic capacitor according to claim 1, wherein
the cover includes the second region.

7. The multi-layer ceramic capacitor according to claim 1, wherein
each of the first region and the second region includes a polycrystal having a Perovskite structure including barium and titanium.

* * * * *